July 14, 1936.  C. E. JACOBS  2,047,634
AIR FILTER AND METHOD OF MAKING THE SAME
Filed Nov. 30, 1932   2 Sheets-Sheet 2
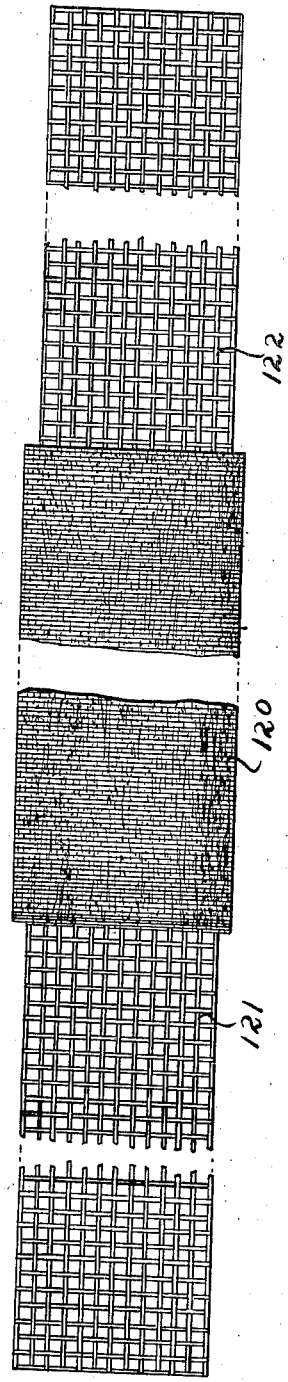
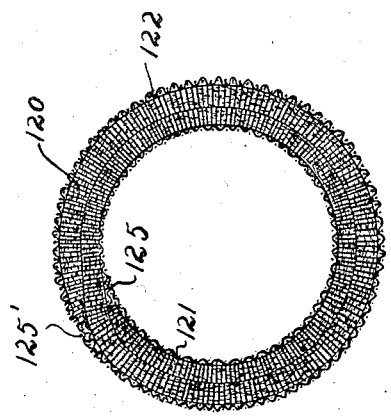
INVENTOR
Clarence E. Jacobs
BY
Swan, Frye & Hardesty
ATTORNEY July 14, 1936.   C. E. JACOBS   2,047,634
AIR FILTER AND METHOD OF MAKING THE SAME
Filed Nov. 30, 1932   2 Sheets-Sheet 1

INVENTOR
Clarence E. Jacobs
BY
Swan, Frye & Hardesty
ATTORNEY

Patented July 14, 1936

2,047,634

UNITED STATES PATENT OFFICE 2,047,634

AIR FILTER AND METHOD OF MAKING THE SAME

Clarence E. Jacobs, Wayne, Mich., assignor to Industrial Wire Cloth Products Company, Wayne, Mich., a corporation of Michigan Application November 30, 1932, Serial No. 645,024

3 Claims. (Cl. 183—73)

This invention relates to air cleaners or filters for internal combustion engines. The removal of dust and dirt from air entering automobile engines has been attempted in a number of different ways and with varying degrees of success, the principal methods heretofore employed being classifiable as either attempts to throw out the dirt by purely centrifugal action, or as filtering processes, of which various sorts have been tried and used.

Centrifugal cleaners require high air velocities in order to operate with any sufficient degree of effectiveness, and consequently do not clean the air at low speeds.

The "wire cloth" and most other types of filters heretofore used have been objectionable in that as the rate of air flow through them increased, the relative restriction offered by the filter also increased, and the efficiency of the filter at the same time dropped to such a degree as to be undesirable.

It has been found, also, that the knitted flat wire types of filter, upon increase of air velocity therethrough to such rates as are represented by high engine and car speeds, will, due to the regularity of the openings, offer greatly and undesirably increased restriction to the air flow, if a sufficient filter bed is used to effect proper filtration at lower speeds.

It has been with the aforementioned facts and the overcoming of the discussed difficulties in mind that the improved filter construction herein disclosed has been developed, and the primary objects thereof have accordingly been the overcoming of such difficulties and the provision of an air filter which functions efficiently under all conditions.

Another important object of this invention is the provision of such an improved air filter which is of very simple and inexpensive construction.

Other objects and advantages will be apparent from the following description, wherein reference is made to the accompanying drawings illustrating preferred embodiments of my invention and wherein similar reference characters designate similar parts throughout the several views.

In the drawings:

Figure 6 is a plan view, partly broken away, of a filter unit of modified form before final forming and assembly, and Figure 7 is an end view of a completed unit of this type.

Figure 1:
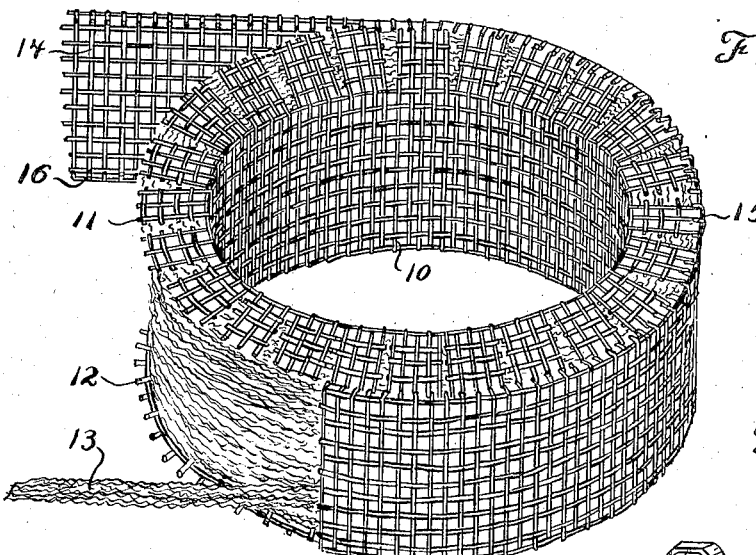
Figure 1 is a perspective view of a partly assembled filter unit embodying the principles of this invention.
Figure 2:
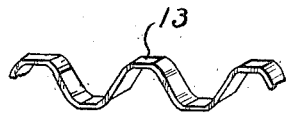
Figure 2 is a detail perspective view of a fragment of one of the flat wire strands of which the filtering medium is composed.

Referring now to the drawings: Reference character 10 designates an inner spool-like cylindrical form or mandrel having outwardly projecting flanges 11—12 at its ends, and upon the body of which the filtering medium, comprising a plurality of crinkled flat wire strands 13, is adapted to be wound. The form may be made of any suitable reticulated or perforated material, ordinary wire screening of coarse mesh being appropriate, as shown. The strands may be of copper, although whatever metal be used it is preferably fairly hard, so that they may be wound under sufficient tension without straightening out the crinkles. The flattened and crinkled wire may be formed by running round wire through a pair of slightly spaced gears. The restriction offered by the completed filter of course depends not only upon the number of strands used but upon the pitch of the crinkles and the tightness of winding. The strands are wound in more or less haphazard fashion, and of course the undulations formed in the wire might be irregular rather than regular, if desired, the result in any case being a filter bed having an infinite number of paths extending therethrough at an infinite variety of angles. When the wire is wound circumferentially, a number of strands at a time, upon an annular mesh form, as shown in Figure 1, the ends of the strands are secured in place when a desired amount of the filtering wire has been wound upon the form, as by soldering or welding the strands to one of the flanges 11, 12, or in any other suitable manner, although they might of course be left loose if desired.

An outer protective covering, as 14, may be arranged over the assembly and may be secured in place by means of integral inwardly projecting flanges such as is indicated at 15 and 16, adapted to over-engage the outwardly projecting radial flanges 11, 12, to which they may be secured either by being hooked thereto or by soldering or welding. A filter unit of this type is preferably arranged in the air intake in such manner that the inflowing air must travel generally radially through the annular filter bed, and it will be seen that all portions of the filter bed will be of substantially uniform general characteristics if the number of strand layers and the tension under which they are wound are substantially uniform throughout.

Figures 3, 5:
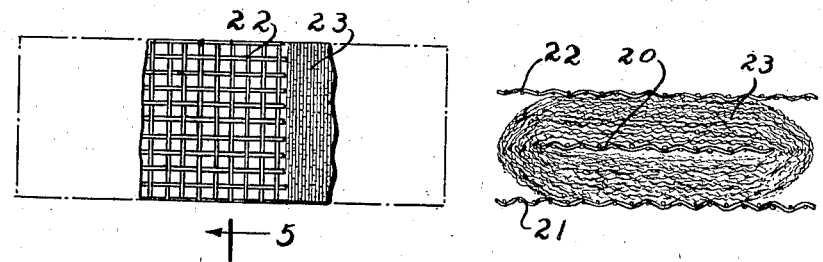
Figure 3 is a fragmentary side view of another filter unit embodying the invention in a somewhat modified form.
Figure 5 is a section taken substantially on the line 5—5 of Figure 4 and looking in the direction of the arrows.
Figure 4:
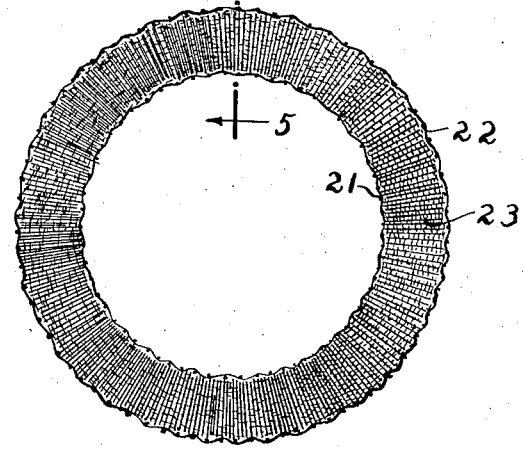
Figure 4 is a top view of such unit.

A somewhat modified form, as shown in Figures 3, 4, and 5, incorporates an inner generally cylindrical mesh form 20 somewhat shorter than the inner and outer cylindrical mesh guards 21, 22, and having wound thereon Gramme ring style i. e., generally longitudinally of the cylindrical assembly, a plurality of crinkled strands as 23, preferably also of flattened wire. The central or filtering unit comprising the support 20 and the strands wound thereon may be formed by winding the strands upon the strip 20, while the latter is in planar or flat strip form, projecting ends being left uncovered in such winding which are long enough to be lapped together to secure the form 20 and so the filtering assembly in cylindrical form. The winding is then completed to cover the lapped joint, and the ends of the strands secured in any suitable fashion. The inner and outer guards 21, 22 may then easily be slipped into place, and the assembly is ready for installation in the filter supporting mounting, not shown.

Another modification more or less a variation of that last described is shown in Figures 6 and 7. As there indicated, a frame in the form of a strip of wire mesh 125 is used to form both a support and inner and outer guard screens, being of such length that it may be wrapped both initially to form the inner guard ring portion 121, and over the intermediate wound portion 120 forming the filter bed. When the unit is completed, as shown in Fig. 7, the outer wrapped portion forms an exterior guard screen (designated 122). As also indicated in Figure 7, more than one turn of the interior wound or filter portion 120 may be employed, and if so, the winding of the filtering strands upon the form may be less dense, but equal filtering efficiency will nevertheless be provided if an equal total number of strand turns are used, with less air restriction however because of the greater spacing of strands.

The filtering efficiency, disregarding the ability of the filter to hold the dirt particles after stopping them, will be seen to depend upon the number of irregularities introduced into the air paths through which the many air streams flow, each "jog" or change of direction of a path forming a point at which the inertia of an inflowing dirt particle may carry it against one of the oily strands, to which it of course adheres. Accordingly, by the use of less dense strand winding but more convolutions of the filter portion 120, an equal number of such air path irregularities may be provided with wider strand spacing and resultantly less air flow restriction. If on the other hand the central wound area is made similarly to the unit 20 of the last described embodiment, the provision of integral inner and outer guard screens by a simple rolling of the single strip enables more economical manufacture of the unit. As best appears in Figure 7, the ends of the screen strip may be lapped, as at 125—125', at which point they may be soldered or welded.

Obviously the filtering efficiency and restriction may also be varied to any desired degree in any of the filter forms shown by varying the width of the wire, the thickness of the winding, the pitch and size of the crinkles and/or the tension of winding.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In a filter for the air intake of an internal combustion engine, a filter bed comprising a substantially cylindrical annulus of woven wire screen having wound thereon a plurality of turns of flattened crinkled wire, said strands being wound Gramme ring style.

2. In a filter for the air intake of an internal combustion engine, a filter bed comprising a substantially cylindrical annulus of reticulated sheet material adapted to act as a core and support for filtering material, and a filter bed composed of a multiplicity of strands of flattened crinkled wire completely covering both faces of said sheet and the edges thereof, said strands being generally parallel to the axis of said annulus and continuous from one face over the edges and the other face of said sheet.

3. The method of forming a filter bed which comprises winding flattened crinkled filamentary material upon an extended reticulated member, said winding being made crosswise of said member, then bringing together the ends of said wound member to thereby form an annulus.

CLARENCE E. JACOBS.